United States Patent
Phung et al.

(10) Patent No.: US 12,191,051 B2
(45) Date of Patent: Jan. 7, 2025

(54) COHERENT INTERCONNECTS BETWEEN SUPERCONDUCTING QUBITS AND MICROWAVE-OPTICAL TRANSDUCERS

(71) Applicant: International Business Machines Corporation, Armonk, NY (US)

(72) Inventors: Timothy Phung, Milpitas, CA (US); Moein Malekakhlagh, Elmsford, NY (US); Jason S. Orcutt, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 18/329,743

(22) Filed: Jun. 6, 2023

(65) Prior Publication Data
US 2024/0412898 A1   Dec. 12, 2024

(51) Int. Cl.
G06N 10/40   (2022.01)
H01B 12/02   (2006.01)

(52) U.S. Cl.
CPC ............. *H01B 12/02* (2013.01); *G06N 10/40* (2022.01)

(58) Field of Classification Search
CPC ................................ G06N 10/40; H01B 12/02
USPC ......................................................... 327/527
See application file for complete search history.

(56) References Cited

U.S. PATENT DOCUMENTS

| | | | |
|---|---|---|---|
| 9,260,289 B2 | 2/2016 | Park | |
| 9,454,061 B1 | 9/2016 | Abdo et al. | |
| 10,319,896 B2 | 6/2019 | Falcon et al. | |
| 11,005,574 B2 | 5/2021 | Bronn et al. | |
| 11,522,117 B2 | 12/2022 | Englund et al. | |
| 2020/0243601 A1* | 7/2020 | Orcutt | G06N 10/00 |
| 2021/0217809 A1* | 7/2021 | Orcutt | G02B 6/29341 |
| 2021/0280765 A1 | 9/2021 | Huang | |
| 2022/0215281 A1 | 7/2022 | Englund et al. | |

(Continued)

FOREIGN PATENT DOCUMENTS

| | | |
|---|---|---|
| WO | 2021/105119 A1 | 6/2021 |
| WO | 2023/284816 A1 | 1/2023 |

OTHER PUBLICATIONS

Mirhosseini, et al., "Superconducting qubit to optical photon transduction," Nature vol. 588, pp. 599-603 (Dec. 23, 2020).

(Continued)

*Primary Examiner* — William Hernandez
(74) *Attorney, Agent, or Firm* — Amin, Turocy & Watson, LLP

(57) ABSTRACT

Systems and techniques that facilitate enabling transfer of a quantum state between a quantum device and a microwave resonator of a microwave optical transducer. In various embodiments, a system can comprise a quantum device, a microwave optical transducer including a microwave resonator, and a coherent interconnect. In various embodiments, the coherent interconnect can be between the quantum device and the microwave optical transducer that can enable bi-directional transfer of a quantum state between the quantum device and the microwave resonator. In various embodiments, the microwave optical transducer can be separately packaged from the quantum device. With various embodiments, the coherent interconnect can be a superconducting coaxial cable.

20 Claims, 11 Drawing Sheets

(56) References Cited

U.S. PATENT DOCUMENTS

2022/0222567 A1* 7/2022 Reagor ................. G06N 10/40

OTHER PUBLICATIONS

Delaney, et al., "Superconducting-qubit readout via low-backaction electro-optic transduction," Nature vol. 606, pp. 489-493 (Jun. 15, 2022).
Weaver, et al., "An integrated microwave-to-optics interface for scalable quantum computing," arXiv:2210.15702v1 [quant-ph] Oct. 27, 2022.
List of IBM Patents or Applications Treated as Related.
Zhong, et al., "Deterministic multi-qubit entanglement in a quantum network," Nature vol. 590, pp. 571-575 (Feb. 24, 2021).
Yan, et al., "Entanglement Purification and Protection in a Superconducting Quantum Network," Phys. Rev. Lett. 128, 080504—Published Feb. 22, 2022.
Niu, et al., "Low-loss interconnects for modular superconducting quantum processors," rXiv:2302.02751v1 [quant-ph] Feb. 6, 2023.
Qiu, et al., "Deterministic quantum teleportation between distant superconducting chips," arXiv:2302.08756v1 [quant-ph] Feb. 17, 2023.
International Searching Authority, "Notification of Transmittal of the International Search Report and the Written Opinion of the International Searching Authority, or Declaration," Patent Cooperation Treaty, Oct. 21, 2024, 22 pages, International Application No. PCT/EP2024/064136.

* cited by examiner

COHERENT INTERCONNECTS BETWEEN SUPERCONDUCTING QUBITS AND MICROWAVE-OPTICAL TRANSDUCERS

TECHNICAL FIELD

The present disclosure relates to coherent interconnects between superconducting qubits and microwave-optical transducers, and further, separately packaging microwave-optical transducers and qubits and performing a state transfer operation between.

BACKGROUND

Operations on qubits generally introduce some error in quantum systems, such as some level of decoherence and or some level of quantum noise affecting qubit availability. Such errors can include quantum noise generated by outside sources. A T1 (energy relaxation time) of a qubit can fluctuate in time due to quantum noise which can lead to decreases in the coherence times of quantum systems. Microwave resonators and optical transducers can be used to transfer quantum information from a quantum device within a dilution fridge to another quantum device within another dilution fridge, thus increasing the scalability of quantum systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system can comprise a quantum device, a microwave optical transducer including a microwave resonator, and a coherent interconnect between the quantum device and the microwave optical transducer. The microwave optical transducer can enable bi-directional transfer of a quantum state between the quantum device and the microwave resonator. In one or more embodiments of the aforementioned system, the microwave optical transducer can be separately packaged from the quantum device. In one or more embodiments of the aforementioned system, the coherent interconnect can be a superconducting coaxial cable; and the superconducting coaxial cable can include a length of up to 10 centimeters. With embodiments, the quantum device can be a transmon qubit. In one or more embodiments of the aforementioned system, the quantum device can be connected to a flux-tunable element that can modulate the coupling between the quantum device and the coherent interconnect.

In one or more embodiments of the aforementioned system, the flux-tunable element can be a transmon qubit. With more embodiments, the flux-tunable element can be a radio frequency superconducting quantum interference device (RF-SQUID). The coherent interconnect can include a DC-SQUID connected in series to the coherent interconnect to permit frequency tuning of mode frequencies of the coherent interconnect.

An advantage of the above-indicated system can be providing for increased distances between quantum devices without increasing the risk of outside interference which can lead to diminished qubit performance. Separately packaging the transducer from the quantum device can increase scalability of connected quantum systems, allowing for more complex quantum computations and systems.

According to another embodiment, a device can comprise a flux-tunable qubit; a microwave optical transducer; and a coherent interconnect including a cable coupling the flux-tunable qubit to the microwave optical transducer to enable bi-directional transfer of a quantum state between the microwave optical transducer and the flux-tunable qubit. In one or more embodiments, the microwave optical transducer can be separately packaged from the flux-tunable qubit; and the coherent interconnect can comprise a flux-tunable coupler. The cable can include a flux-tunable DC-SQUID to facilitate frequency tuning of mode frequencies of the device.

In one or more embodiments of the aforementioned deice, the microwave optical transducer can be flux-tunable, and in other embodiments, the microwave optical transducer cannot be flux-tunable. The cable can include a flux-tunable DC-SQUID to facilitate frequency tuning of mode frequencies of the device, and the microwave optical transducer cannot be flux-tunable. In other embodiments of the aforementioned device, the cable can be flux-tunable, and the cable cannot be flux-tunable.

An advantage of the above-indicated system can be providing for increased distances between quantum devices without increasing the risk of outside interference which can lead to diminished qubit performance. Separately packaging the transducer from the quantum device can increase scalability of connected quantum systems, allowing for more complex quantum computations and systems.

According to another embodiment, a method can comprise enabling bi-directional transfer of a quantum state between a quantum device and a microwave resonator of a microwave optical transducer via a coherent interconnect connected between the quantum device and the microwave optical transducer, wherein the quantum device can be separately packaged from the microwave optical transducer. Additionally, the method can comprise tuning the quantum device to be in resonance with a mode of a cable of the coherent interconnect, and the method can also comprise activating coupling to transfer the quantum state to the mode of the cable.

In one or more embodiments of the aforementioned method, the method can comprise tuning the mode of the cable to be in resonance with the microwave resonator that is part of the microwave optical transducer. Additionally, the method can comprise tuning a lumped element of the microwave resonator to be in resonance with the mode of the cable.

An advantage of the above-indicated method can be providing for increased distances between quantum devices without increasing the risk of outside interference which can lead to diminished qubit performance. Separately packaging the transducer from the quantum device can increase scalability of connected quantum systems, allowing for more complex quantum computations and systems.

DETAILED DESCRIPTION

Figure 1:
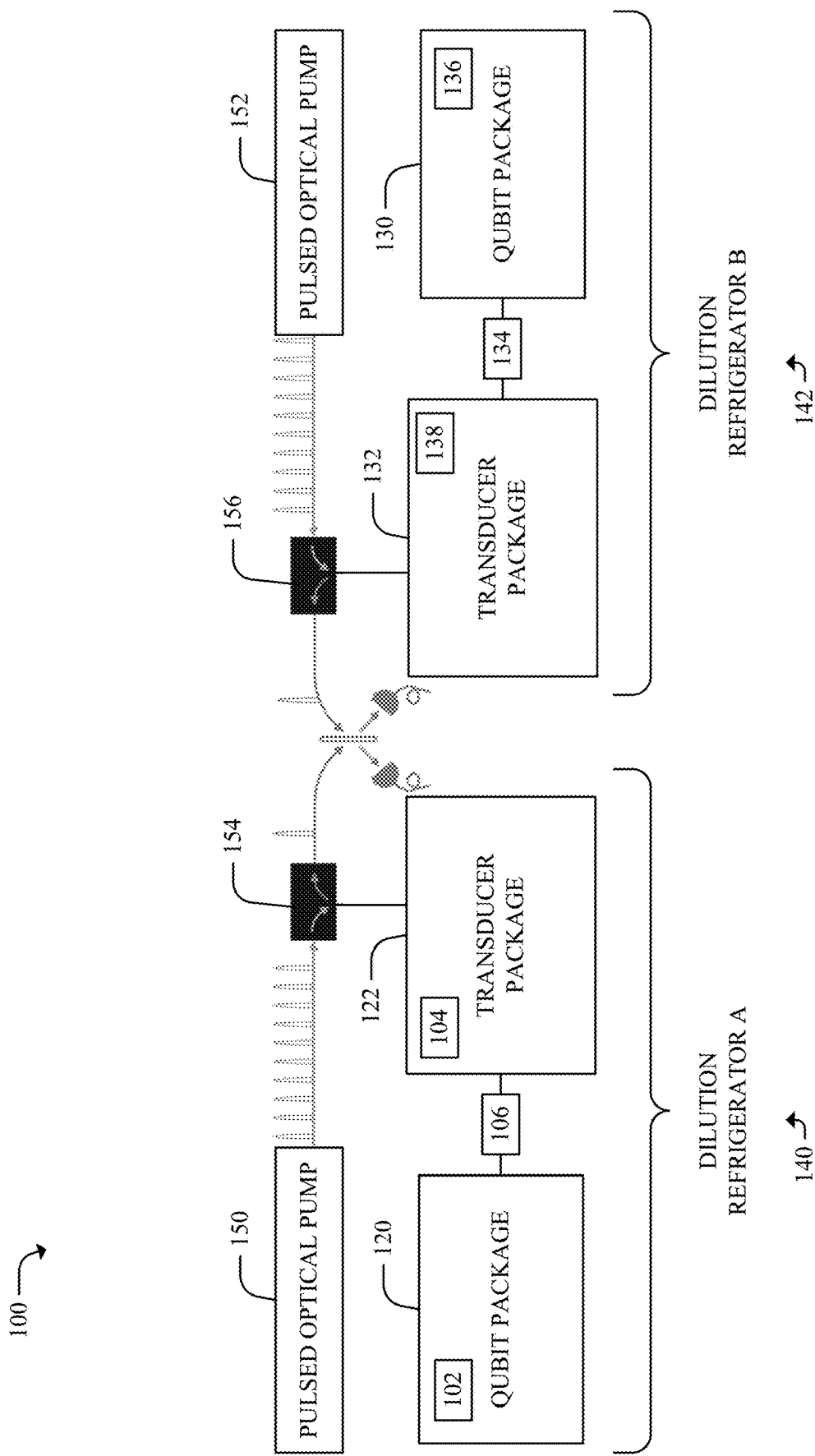
FIG. 1 illustrates a diagram of an example, non-limiting coherent interconnect system that can facilitate the transfer of a quantum state between a superconducting device and a microwave resonator in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, a quantum circuit can be a set of operations, such as gates, performed on a set of real-world physical qubits with the purpose of obtaining one or more qubit measurements. A quantum processor can comprise the one or more real-world physical qubits.

Qubit states only can exist (or can only be coherent) for a limited amount of time. Thus, an objective of operation of a quantum logic circuit (e.g., including one or more qubits) can be to maximize the coherence time of the employed qubits. Time spent to operate the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit can be facilitated, such as by a waveform generator, to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Quantum noise can refer to noise attributable to the discrete and/or probabilistic natures of quantum interactions.

A two-level system (TLS), among other noise causes, can comprise a source of noise that can cause deterioration of coherence parameters (e.g., shorter T1) of one or more qubits of a quantum logic circuit. TLSs are believed to be able to coherently or incoherently couple to the qubit leading to either faster energy relaxation times or rate of energy decay (e.g., shorter T1s corresponding to an exponential 1/e decay time) as well as faster phase decoherence (e.g., T2). That is, the noise can couple to a low-energy thermal fluctuator, for example, which can randomly change the TLS energy resonance (or the equivalent frequency of the TLS resonance). A TLS can spectrally diffuse into and out of resonance with the qubit frequency when the TLS is in the vicinity of a qubit frequency. This is a source of T1 fluctuation.

The qubit frequency is the resonance frequency of a qubit energy transition between two states such as, but not limited to, the ground and first excited states of the qubit. The vicinity of a qubit frequency is a frequency range which in some embodiments can range from about 10 megahertz (MHz) below the qubit frequency to about 10 MHz above the qubit frequency. In other embodiments, the vicinity of a qubit frequency can range from about 100 MHZ below the qubit frequency to about 100 MHz above the qubit frequency. In still other embodiments, the vicinity of a qubit frequency can range from about 1 gigahertz (GHz) below the qubit frequency to about 1 GHz above the qubit frequency. Without being limited to theory, it is believed that such two-level systems can be caused by atomic scale defects in surface oxides on the metals and/or on the substrate material of a physical real-world qubit and can be electromagnetically active. Indeed, a qubit, such as a transmon itself is a resonator with an electromagnetic excitation, and thus a qubit excitation can couple with a two-level system (TLS) and can cause performance issues for a quantum logic circuit, such as, but not limited to, deterioration of qubit parameters, such as qubit gate error rate.

Due to presence of two-level systems in/at the quantum system and/or due to maintenance and/or diagnostics to be performed relative to coherence times of a particular qubit, one or more qubits, such as superconducting qubits, can be unavailable and/or not recommended for use with the quantum logic circuit, even if desired for use. Furthermore, absent understanding of such two-level systems and their associated fluctuations relative to the frequency domain of one or more qubits of a quantum system, coherence of the qubit can be affected. Loss of coherence can cause failure of execution of a quantum circuit.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. In one or more described embodiments, computer and/or computing-based elements can be used in connection with implementing one or more of the systems, devices, components and/or computer-implemented operations shown and/or described in connection with the figures described herein.

Turning first generally to FIG. 1, one or more embodiments described herein can include one or more devices, systems and/or apparatuses that can facilitate performing a swap or state transfer operation between a superconducting qubit device and a linear resonator that can be part of the transduction device. For example, FIG. 1 illustrates a diagram of an example, non-limiting, quantum coherent interconnect system 100 that comprises a quantum device 102, a microwave optical transducer 104, and a coherent interconnect 106 between the quantum device 102 and the microwave optical transducer 104. With embodiments, and without limitation, the microwave optical transducer 104 can include a lumped element resonator or a distributed element resonator. The system 100 can include a first qubit package 120 that can include the quantum device 102; and the system 100 can include a first transducer package 122 that can include the microwave optical transducer 104. The first qubit package 120 can be coupled with a first transducer package 122 via the coherent interconnect 106. The first qubit package 120, the coherent interconnect 106, and the transducer package can be disposed within a first dilution refrigerator 140 (e.g., Dilution Refrigerator A), and similarly, the second qubit package 130, the second coherent interconnect 134, and the second transducer package 132 can be disposed within a second dilution refrigerator 142 (e.g., Dilution Refrigerator B).

With examples, the system 100 can include a second qubit package 130 coupled with a second transducer package 132. The second qubit package 130 can be substantially similar and/or include similar components and configurations as the first qubit package 120. Alternatively, the second qubit package 130 can include different quantum components than the first qubit package 120. The second transducer package 132 can be substantially similar and/or include similar components and configurations as the first transducer package 122. Alternatively, the second qubit package 130 can include different transducer components than the first transducer package 122. A second coherent interconnect 134 can couple the second qubit package 130 with the second transducer package 132. The second qubit package 130 can include a second quantum device 136, and the second transducer package 132 can include a second microwave optical transducer 138.

The coherent interconnect 106 and/or the second coherent interconnect 134 can include a first cable and a second cable that can couple the first qubit package 120 with the first transducer package 122 and can couple the second qubit package 130 with the second transducer package 132. Further, the first cable and the second cable can include one or more of a variety of lengths coupling the first qubit package 120 with the first transducer package 122 and coupling the second qubit package 130 with the second transducer package 132 over a variety of distances. For example and without limitation, the first cable and the second cable can be superconducting coaxial cables include a length of about 5 centimeters (e.g., which can be up to about 10 centimeters or more or less).

Further, one or more optical signals, which can be generated from a first pulsed optical pump 150 and a second pulsed optical pump 152, can be converted with a microwave signal 154, 156 to entangle the state of the quantum device 102 coupled to the first transducer package 122 with the second transducer package 132. Bell measurements can be taken at room temperature exterior to the first dilution refrigerator 140 and the second dilution refrigerator 142. In this manner, the first transducer package 122 (e.g., the quantum device 102) can interact with the second transducer package 132 (e.g., a second quantum device 136) to transfer or swap qubit states of the quantum devices 102, 136. The one or more optical signals can be brought into one or more microwave optical transducers 104, 138 of the transducer packages 122, 132, which can be converted with a microwave signal 154, 156 to result in a quantum optical signal where protocols can be engaged to facilitate the entanglement of the state of the quantum device 102 in the first dilution refrigerator 140 with the second quantum device 136 in the second dilution refrigerator 142, promoting modular connectivity and scalability between quantum devices.

Figure 2:
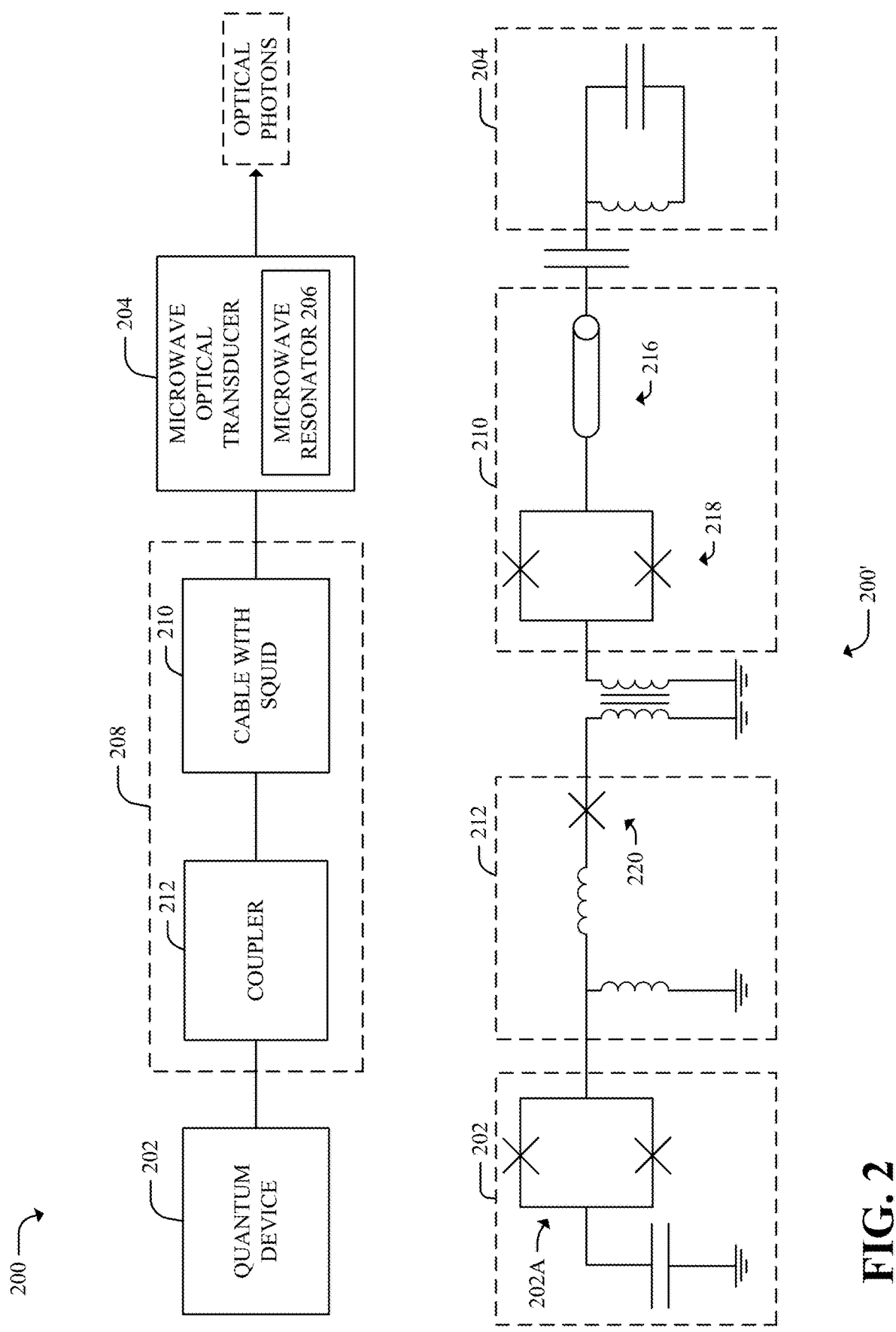
FIG. 2 illustrates a diagram of an example, non-limiting coherent interconnect system that can facilitate the transfer of a quantum state between a superconducting device and a microwave resonator in accordance with one or more embodiments described herein.

With examples, such as generally illustrated in FIG. 2, a non-limiting quantum coherent interconnect system 200 can include a quantum device 202, a microwave optical transducer 204 including a microwave resonator 206, and a coherent interconnect 208 connected between the quantum device 202 and the microwave resonator 206. The non-limiting quantum coherent interconnect system 200 can transfer a state of a qubit of the quantum device 202 to the microwave resonator 206 of the microwave optical transducer 204. Further, the quantum device 202 of the non-limiting quantum coherent interconnect system 200 can include a quantum state (e.g., the quantum state can be a superposition of the 0 and 1 state) to transfer to another quantum device elsewhere (e.g., outside the qubit package from the first dilution refrigerator 140 to the second dilution refrigerator 142 as shown in FIG. 1). The quantum device 202 can be one or more of a variety of qubit integrated devices, such as a transmon qubit 202A.

In embodiments, the coherent interconnect 208 can be responsible for transferring the quantum state of the quantum device 202 to the optical microwave transducer 204. Further, the microwave optical transducer 204 can be separately packaged from the quantum device 202 (e.g., such as illustrated in FIG. 1). The coherent interconnect 208 can include a flux-tunable element 212 and/or a superconducting coaxial cable 210 including one or more of a variety of lengths. For example and without limitation, a length of the superconducting coaxial cable 210 can include a range of up to about 10 centimeters, or more or less. In examples, the length can be about 5 centimeters. With embodiments, the superconducting coaxial cable 210 can be in the ground state, and the microwave optical transducer 204 can be in the ground state.

With embodiments, as illustrated in FIG. 2, the superconducting coaxial cable 210 can include a DC-SQUID 216. The superconducting coaxial cable 210 can include a flux-tunable DC-SQUID 216 to facilitate frequency tuning of modes of the superconducting coaxial cable 210. Additionally, the coherent interconnect 208 can include a flux-tunable element 212 (e.g., a coupler) that can modulate the coupling between the quantum device 202 and the coherent interconnect 208.

Further, FIG. 2 illustrates a circuit 200' representative of non-limiting quantum coherent interconnect system 200, further representative of non-limiting quantum coherent interconnect system 100. For example and without limitation, the circuit 200' can include a quantum device 202 (e.g., a transmon qubit 202A) coupled to a microwave optical transducer 204 including a microwave resonator 206 via a coherent interconnect 208. The quantum device 202 can be grounded, as shown in FIG. 2. The coherent interconnect 208 can include a flux-tunable element 212 that can modulate the coupling between the quantum device 202 and the coherent interconnect 208. The flux-tunable element 212 can include an Gmon coupler or a Radio Frequency Superconducting Quantum Interference Device (RF SQUID) 220.

Additionally, the superconducting coaxial cable 210 of the non-limiting quantum coherent interconnect system 200 can include a cable portion 216 and a DC-SQUID 218. The DC-SQUID 218 of the superconducting coaxial cable 210 can be inductively coupled to the flux-tunable element 212 (e.g., the grounded transmon/RF SQUID). The cable portion 216 of the superconducting coaxial cable 210 can be coupled (e.g., capacitively or inductively) with the microwave optical transducer 204 and the microwave resonator 206. The superconducting coaxial cable 210 can include a length of about 5 centimeters and a spacing of modes at about 2 GHZ Free Spectral Range (FSR).

In embodiments, the quantum device 202, the microwave optical transducer 204 (e.g., the microwave resonator 206), and the coherent interconnect 208 (e.g., the flux-tunable element 212 and the superconducting coaxial cable 210) of the non-limiting quantum coherent interconnect system 200 can be flux-tunable components. The quantum state (e.g., |qubit, cable, resonator)) of the quantum device 202 can be transferred to the microwave resonator 206 via the coherent interconnect 208. The quantum state of the quantum device 202 can be tuned to be in resonance with a mode of the superconducting coaxial cable 210 (e.g., $\alpha|0\rangle+|1\rangle|0\rangle|0\rangle$)). In response to the quantum device 202 tuned to be resonant with the superconducting coaxal cable 210, the quantum state of the quantum device 202 can be transmitted to the superconducting coaxial cable 210 by activating the flux-tunable element 212 (e.g., the coupler). Thereafter, the quantum state of the quantum device 202 can be transmitted to the flux-tunable element 212. In response to transmitting the quantum state of the quantum device 202 to the flux-tunable element 212 (e.g., the coupler), the mode of the superconducting coaxial cable 210 can be tuned to be in resonance with the flux-tunable element 212. Thereafter, the quantum state can be transferred to the mode of the superconducting coaxial cable 210.

In response to transmitting the quantum state of the quantum device 202 to the flux-tunable element 212 (e.g., the coupler) and to the mode of the superconducting coaxial cable 210, the superconducting coaxial cable 210 can be tuned to be in resonance with the microwave optical transducer 204. Additionally or alternatively, in embodiments where the microwave resonator 206 can be flux-tunable, the microwave resonator 206 can be tuned to be resonant with the mode of the superconducting coaxial cable 210 (e.g., with or without tuning the superconducting coaxial cable 210). Such tuning can enable the system 100 to transfer a quantum state form the quantum device 202 to the microwave optical transducer 204 (e.g., $|0\rangle(\alpha|0\rangle+\beta|1\rangle)|0\rangle$)). Flux tuning the quantum device 202, the microwave optical transducer 204, the flux-tunable element 212 (e.g., coupler), and the superconducting coaxial cable 210 can provide the largest range of frequencies for the non-limiting quantum coherent interconnect system 200 by using flux-tunable elements. With embodiments, increasing the number of flux-tunable elements can increase the tunable frequency range.

With embodiments, the transfer of quantum states can occur bi-directionally using a time reversed pulsed sequence to facilitate the transfer from the microwave resonator 206 to the quantum device 202 (e.g., $|0\rangle|0\rangle(\alpha|0\rangle+\beta|1\rangle)$). In examples, the time reversed pulsed sequence can include the above process performed in a reserved direction, such that the quantum state can be transmitted from the microwave optical transducer 204 to the quantum device 202. Further, the microwave optical transducer 204 can be tuned to be resonant with the superconducting coaxial cable 210; the superconducting coaxial cable 210 can be tuned to be resonant with the flux-tunable element 212 (e.g., the coupler); and the flux-tunable element 212 can be tuned to be resonant with the quantum device 202 such that a quantum state can be transferred between resonant states. Quantum state transfer between a quantum device 202 and a microwave resonator 206 of a coherent interconnect 208 can occur bi-directionally in accordance with one or more embodiments described herein.

Figure 3:
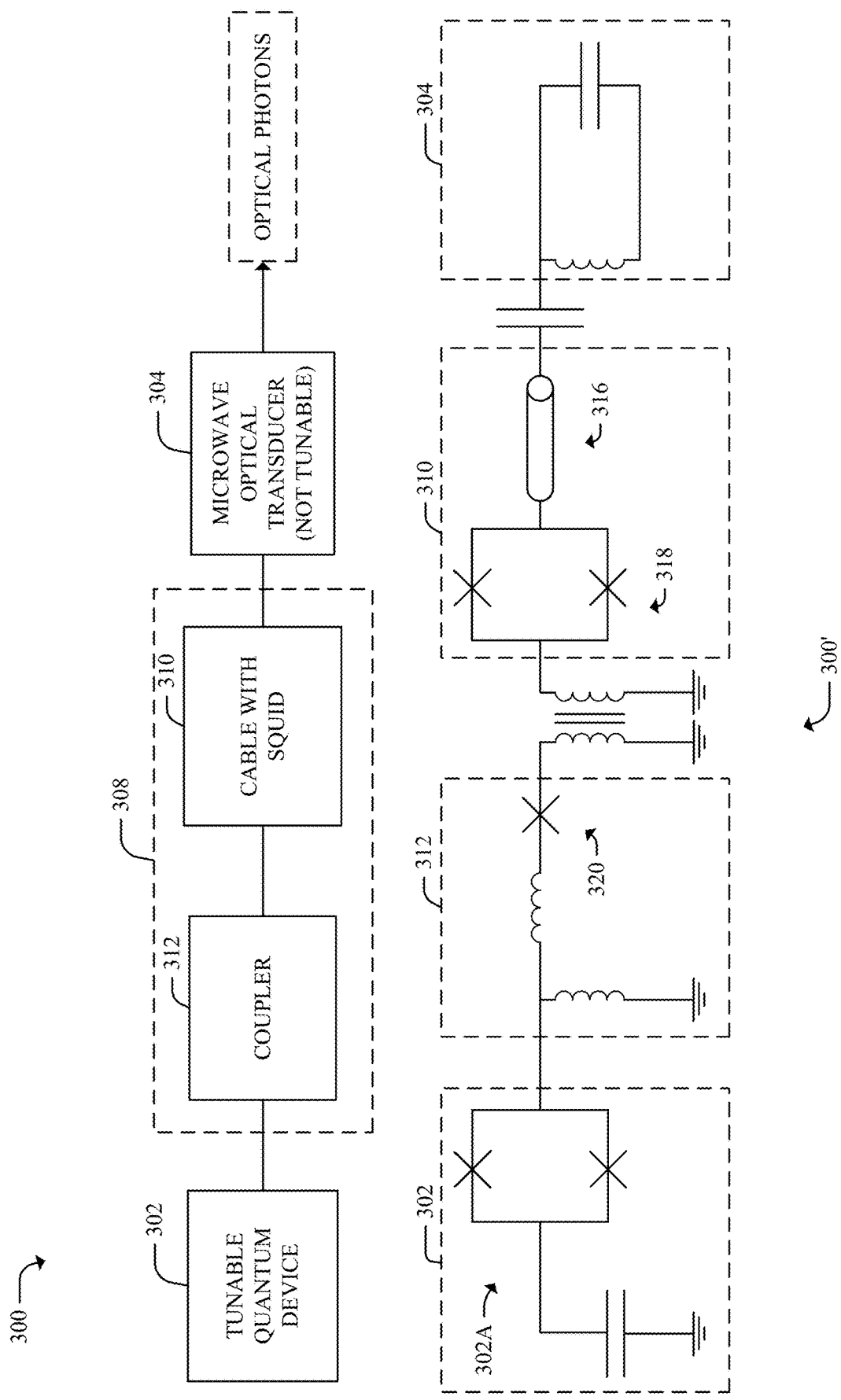
FIG. 3 illustrates a diagram of an example, non-limiting coherent interconnect system that can facilitate the transfer of a quantum state between a superconducting device and a microwave resonator in accordance with one or more embodiments described herein.

With examples, such as generally illustrated in FIG. 3, a non-limiting quantum coherent interconnect system 300 can include a quantum device 302, a microwave optical transducer 304 (e.g., which can include a lumped element or a distributed element resonator) and a coherent interconnect 308. The non-limiting quantum coherent interconnect system 300 can transfer a state of a qubit of the quantum device 302 to the microwave optical transducer 304. The quantum device 302 can be one or more of a variety of qubit integrated devices, such as a transmon qubit 302A.

In embodiments, the coherent interconnect 308 can be responsible for transferring the quantum state of the quantum device 302 to the microwave optical transducer 304. Further, the microwave optical transducer 304 can be separately packaged from the quantum device 302. The coherent interconnect 308 can be a superconducting coaxial cable 310 including one or more of a variety of lengths. With embodiments, the superconducting coaxial cable 310 can be in the ground state, and the microwave optical transducer 304 can be in the ground state.

With embodiments, as illustrated in FIG. 3, the superconducting coaxial cable 310 can include a DC-SQUID 318. The superconducting coaxial cable 310 can include a flux-tunable DC-SQUID 318 to facilitate frequency tuning of mode frequencies of the superconducting coaxial cable 310. Additionally, the coherent interconnect 308 can include a flux-tunable element (e.g., a coupler) 312 that can modulate the coupling between the quantum device 302 and the coherent interconnect 308.

Further, FIG. 3 illustrates a circuit 300' representative of non-limiting quantum coherent interconnect system 300, further representative of embodiments of non-limiting quantum coherent interconnect system 100, 200. For example and without limitation, the circuit 300' can include a quantum device 302 (e.g., a transmon qubit 302A) coupled to a microwave optical transducer 304 via a coherent interconnect 308. The quantum device 302 can be grounded, as shown in FIG. 3. The coherent interconnect 308 can include a flux-tunable element 312 that can modulate the coupling between the quantum device 302 and the coherent interconnect 308. The flux-tunable element 312 can include a grounded transmon/RF SQUID 320.

Additionally, the superconducting coaxial cable 310 of the non-limiting quantum coherent interconnect system 300 can include a cable portion 316 and a DC-SQUID 318. The DC-SQUID 318 of the superconducting coaxial cable 310 can be inductively coupled to the flux-tunable element 312 (e.g., the grounded transmon/RF SQUID 320). The cable portion 316 of the superconducting coaxial cable 310 can be coupled (e.g., capacitively or inductively) with the microwave optical transducer 304 and the microwave resonator 306. The superconducting coaxial cable 310 can include a length of about 5 centimeters and a spacing of modes at about 2 GHZ Free Spectral Range (FSR).

In embodiments, the quantum device 302, the microwave optical transducer 304, and the coherent interconnect 308 (e.g., the flux-tunable element 312 and the superconducting coaxial cable 310) of the non-limiting quantum coherent interconnect system 300 can be flux-tunable. The quantum state of the quantum device 302 can be transferred to the microwave optical transducer 304 via the coherent interconnect 308. The transmon qubit 302A of the quantum device 302 can include a quantum state. The transmon qubit 302A of the quantum device 302 can be tuned to be in resonance with a mode of the superconducting coaxial cable 310. In response to tuning the quantum device 302 to be in resonance with the superconducting coaxial cable 310, the flux-tunable element 312 can be activated to transfer the quantum state from the quantum device 302 to the mode of the superconducting coaxial cable 310. The mode of the superconducting coaxial cable 310 can be tuned to be in resonance with the microwave optical transducer 304. The microwave optical transducer 304 can include a fixed frequency whereby the superconducting coaxial cable 310 can be tuned to be resonant with the microwave optical transducer 304. Such tuning can enable the system 100 to transfer a quantum state form the quantum device 302 to the microwave optical transducer 304. Further, the transfer of quantum states can occur bi-directionally using a time reversed pulsed sequence to effectuate the transfer from the microwave optical transducer 304 to the quantum device 302.

In examples, the time reversed pulsed sequence can include the above process performed in a reserved direction, such that the quantum state can be transmitted from the microwave optical transducer 304 to the quantum device 302. Further, the superconducting coaxial cable 210 can be tuned to be resonant with the microwave optical transducer 304; the flux-tunable element 312 can be tuned to be resonant with the superconducting coaxial cable 310; and the quantum device 302 can be tuned to be in resonant with the flux-tunable element 312 such that a quantum state can be transferred between resonant states. Quantum state transfer between a quantum device 302 and a microwave optical transducer 304 of a coherent interconnect 308 can occur bi-directionally in accordance with one or more embodiments described herein.

With embodiments, the non-limiting quantum coherent interconnect system 300 can be represented by the following Hamiltonian equation:

$$\hat{H}_s(t) \approx \underbrace{\sum_{q=a,b}\left[\omega_q(t)\hat{q}^\dagger\hat{q} + \frac{1}{2}\alpha_q\hat{q}^\dagger\hat{q}^\dagger\hat{q}\hat{q}\right]}_{A} + \underbrace{\omega_r\hat{r}^\dagger\hat{r}}_{B} + \underbrace{\sum_{n=-N}^{N}\omega_{cn}(t)\hat{c}^\dagger\hat{c}_n}_{C} + \underbrace{\sum_{q=a,b}\sum_{n=-N}^{N}g_{qn}(t)(\hat{q}\hat{c}_n^\dagger + \hat{q}^\dagger\hat{c}_n)}_{D} + \underbrace{\sum_{n=-N}^{N}g_{rn}(\hat{r}^\dagger\hat{c}_n + \hat{r}\hat{c}_n^\dagger)}_{E}$$

As illustrated in the Hamiltonian equation above, a first portion of the Hamiltonian equation (e.g., portion A) can represent/describe the behavior of the quantum device 302; and a second portion of the Hamiltonian equation (e.g., portion B) can represent/describe the behavior of the microwave optical transducer 304. Further, the superconducting coaxial cable 310 and the various tunable modes can be represented/described by a third portion of the Hamiltonian equation (e.g., portion C). A fourth portion of the Hamiltonian equation (e.g., portion D) can represent/describe the interaction between the quantum device 302 and the superconducting coaxial cable 310. Additionally, a fifth portion of the Hamiltonian equation (e.g., portion E) can represent/describe the interaction between the superconducting coaxial cable 310 and the microwave optical transducer 304.

Figure 4:
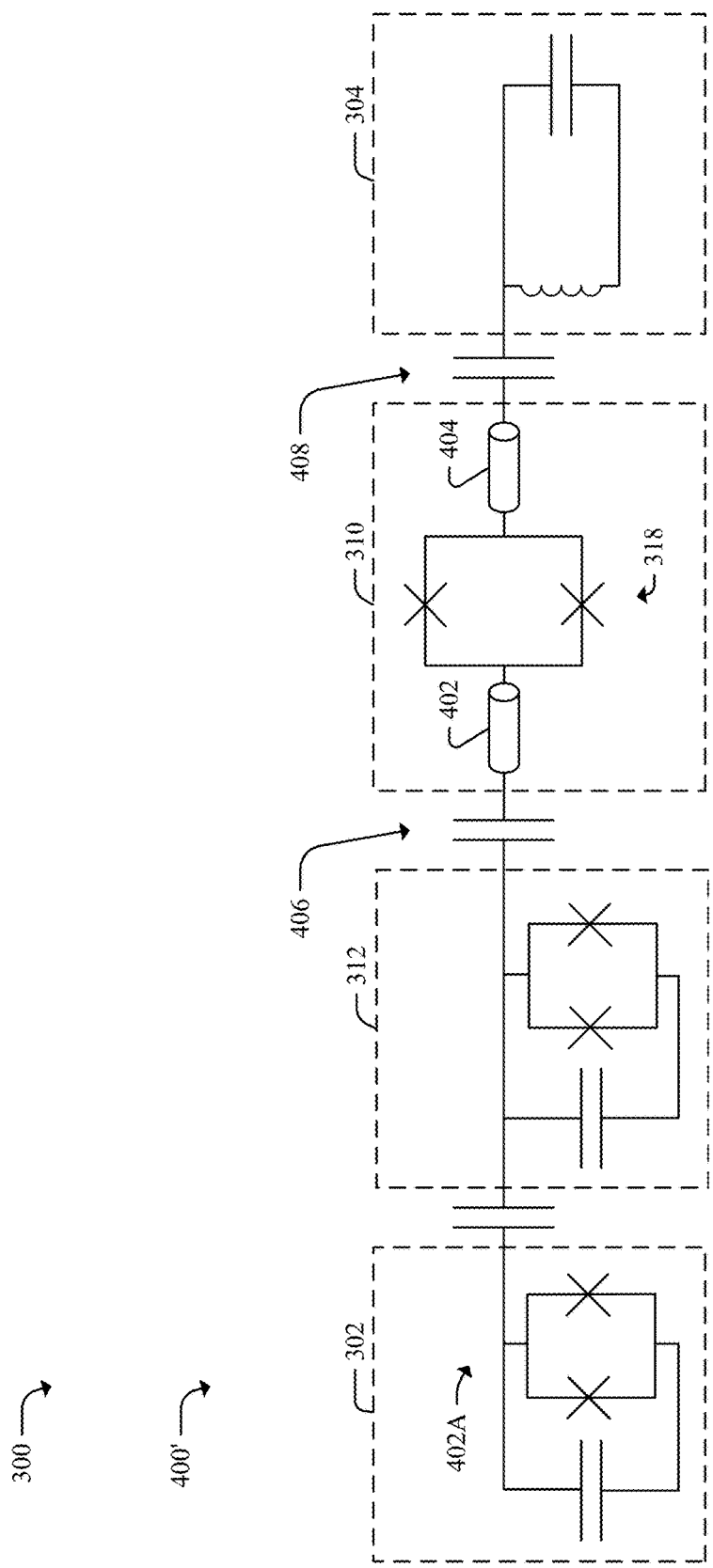
FIG. 4 illustrates a diagram of an example, non-limiting coherent interconnect system that can facilitate the transfer of a quantum state between a superconducting device and a microwave resonator in accordance with one or more embodiments described herein.

As shown in FIG. 4, the circuit 400' can include the quantum device 302 having a transmon qubit 402A (e.g., that is not grounded) and the flux-tunable element 312 can be a qubit-like coupler. Additionally or alternatively, the superconducting coaxial cable 310 can include a SQUID 318 that can be placed away from end points of the superconducting coaxial cable 310 such that the superconducting coaxial cable 310 can be capacitively bonded to the flux-tunable element 312. Further, the SQUID 318 can be disposed between a first end point 402 and a second end point 404 of the superconducting coaxial cable 310 (e.g., such that the SQUID 318 can be disposed on-chip or on-substrate). The first end point 402 can be capacitively coupled to the flux-tunable element 312 (e.g., the tunable coupler) via capacitor 406 and the second end point 404 can be capacitively coupled to the microwave optical transducer 304 via capacitor 408.

Figure 5:
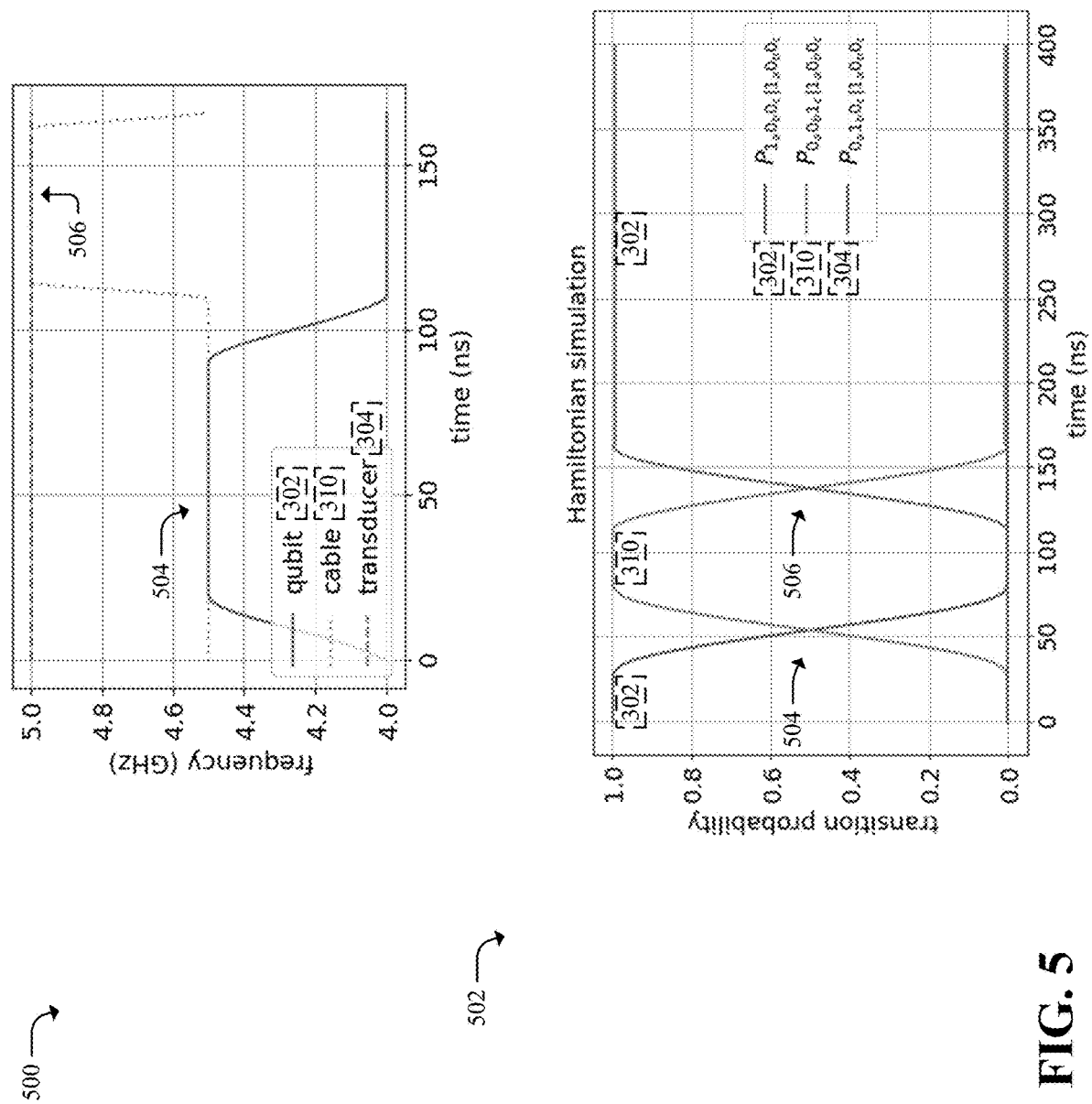
FIG. 5 illustrates a diagram of an example, non-limiting coherent interconnect system that can facilitate the transfer of a quantum state between a superconducting device and a microwave resonator in accordance with one or more embodiments described herein.

With examples, such as illustrated in FIG. 5, the non-limiting quantum coherent interconnect system 300 can be simulated to generate simulation results diagrams 500 and 502. The first simulation results diagram 500 can represent time domain simulations. Further, the Hamiltonian equation from above can be integrated over time to observe the dynamics of the system 300. Such as can be seen from first simulation results diagram 500, the quantum device 302 can start by having a frequency of about 4.0 GHZ. Additionally, the microwave optical transducer 304 can include a fixed frequency of about 5.0 GHz; and the superconducting coaxial cable 310 can include a frequency of about 4.5 GHZ. The quantum device 302 can be brought into resonance with the superconducting coaxial cable 310 such that quantum state can be exchanged. The frequency of the quantum device 302 can be increased to about 4.5 GHz to substantially match the frequency of the superconducting coaxial cable 310 (e.g., such as illustrated at plot 504 on first and second simulation results diagrams 500, 502).

In embodiments, the superconducting coaxial cable 310 can be brought into resonance with the microwave optical transducer 304 such that quantum information can be transferred from the superconducting coaxial cable 310 to the microwave optical transducer 304. For example, the frequency of the superconducting coaxial cable 310 can be increased to about 5.0 GHz to substantially match the frequency of the microwave optical transducer 304, where quantum state can be transferred (e.g., such as illustrated at plot 506 on first and second simulation results diagrams 500, 502). The simulation can include using 5 levels for the quantum device 302 and using 4 levels for the superconducting coaxial cable 310. Further, −240 MHz anharmonicity for the quantum device 302 can be achieved; and the quantum device 302 can be modeled as a duffing oscillator yielding a 99.5% state transfer fidelity rate.

Figure 6:
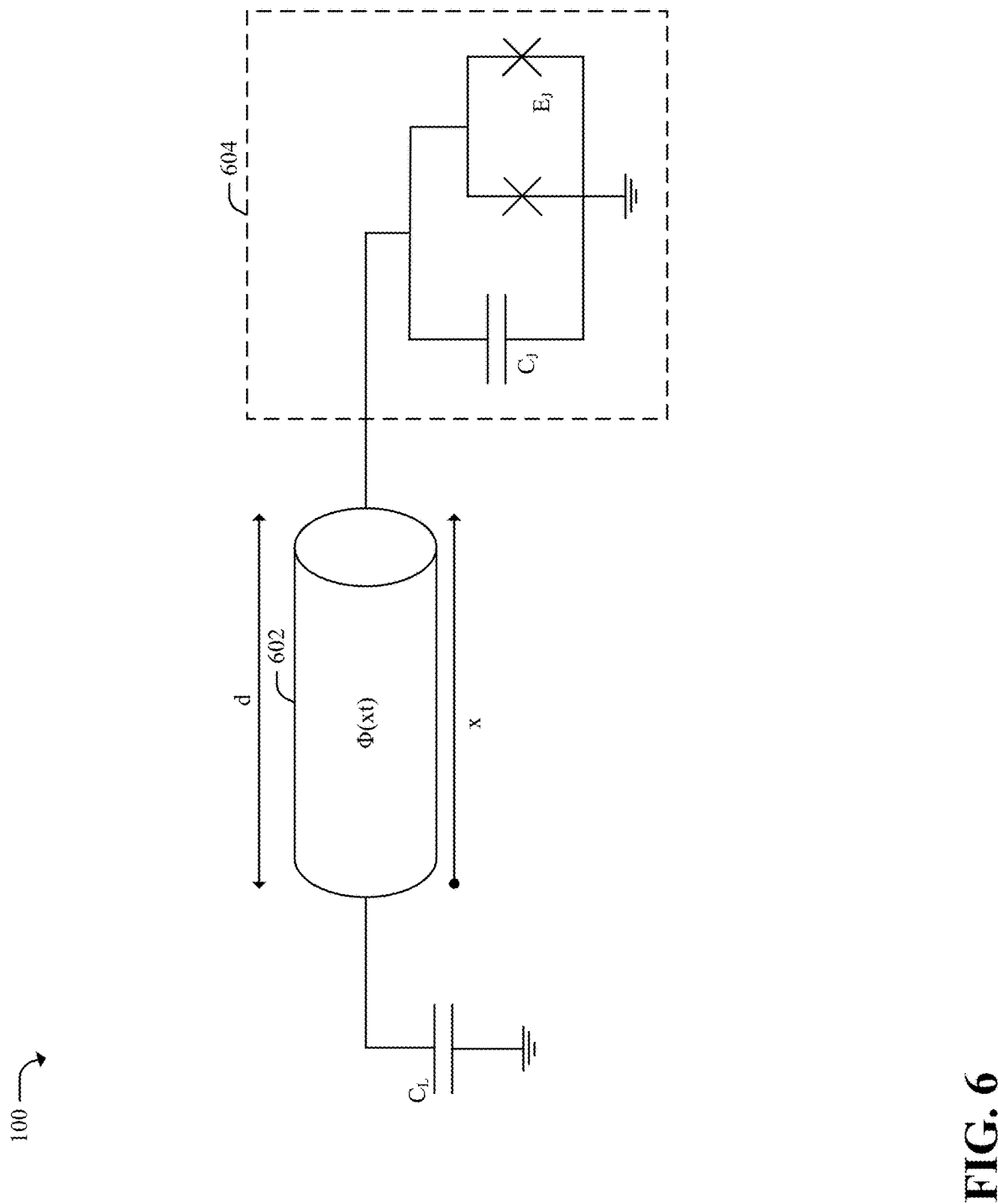
FIG. 6 illustrates a diagram of an example, non-limiting coherent interconnect system that can facilitate the transfer of a quantum state between a superconducting device and a microwave resonator in accordance with one or more embodiments described herein.

With examples, one or more equations can model the tuning range for the superconducting coaxial cable 310 (e.g., the cable portion 316 and the DC-SQUID 318) used in the one or more embodiments of the non-limiting quantum coherent interconnect system 100, 200, 300. FIG. 6 generally illustrates a superconducting coaxial cable 602 terminated at a DC-SQUID 604. The presence of the DC-SQUID 604 can modify the effective inductance of the microwave optical transducer 304 at one end and can be treated as a boundary condition. The Helmholtz equation can be solved for the flux field inside the microwave optical transducer 304 with boundary conditions as modified by the presence of the DC-SQUID 604 By tuning the external flux, we can change the boundary condition for the Helmholtz equation and solve for the cable in terms of flux via Fourier transform:

$$\partial_x^2 \Phi(x, \omega) + \left(\frac{\omega}{v_p}\right)^2 \Phi(x, \omega) = 0$$

The boundary conditions for the above equation are as follows. As expressed in the following equation, the left part of the cable 602 is not coupled to anything external, so the current can be zero:

$$-\frac{1}{j}\partial_x \Phi(x, \omega)|_{x=0} = 0$$

In the above equation, x can be a variable to represent any arbitrary position along the cable 602, and d can be a variable to represent a specific point towards the right part of the cable 602 (e.g., an end point). Secondly, the current that leaves the cable 602 is equal to the current that goes into the capacitor CJ (which can be the sum of the currents of the capacitor and DC-SQUID 604, collectively). The tunablity of the DC-SQUID 604 (e.g., as shown in FIG. 3) is represented by the cosine shown in the equation below (where the cosine term represents the tunability of the cable 602 due to the DC-SQUID 604):

$$-\frac{1}{j}\partial_x \Phi(x, \omega)|_{x=d} = -C_J \omega \Phi(d, \omega) + \frac{\Phi(d, \omega)}{\frac{L_J}{\left|\cos\left(\pi \frac{\Phi_{external}}{\Phi_0}\right)\right|}}$$

Using the Helmholtz equation, a discrete set of modes can be determined of the cable 602 by the following equation:

$$\Phi(x, k_n) = A_n \cos(k_n x)$$

A characteristic equation representative for the mode frequency ($k_n = \omega_n / v_p$) as a function of externally applied flux $\Phi_{external}$ can be expressed as:

$$k_n d \tan(k_n d) = -\frac{C_J}{cd}(k_n d)^2 + \frac{ld}{L_J}\left|\cos\left(\pi \frac{\Phi_{external}}{\Phi_0}\right)\right|$$

Figure 7:
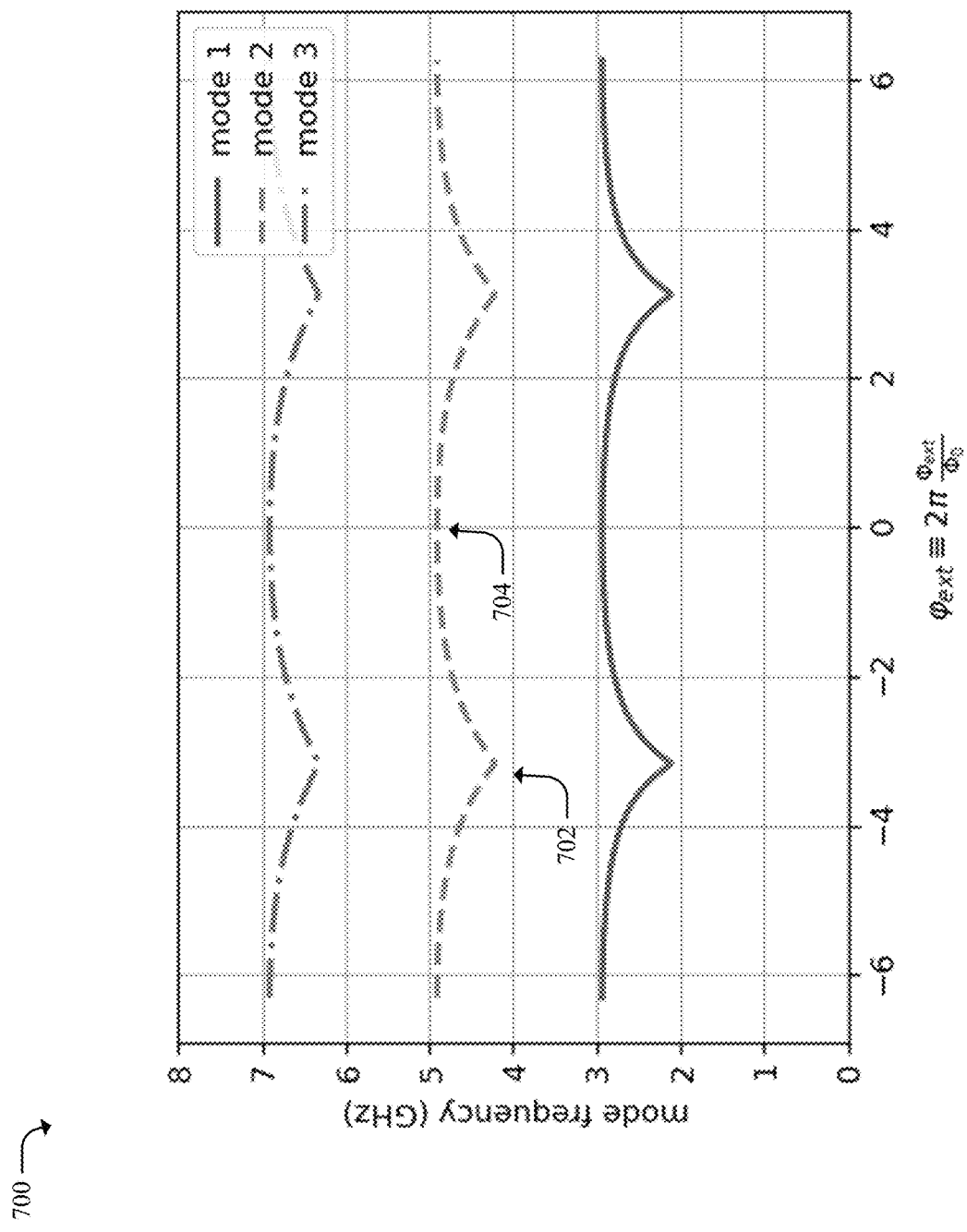
FIG. 7 illustrates a diagram of an example, non-limiting coherent interconnect system that can facilitate the transfer of a quantum state between a superconducting device and a microwave resonator in accordance with one or more embodiments described herein.

With embodiments, FIG. 7 includes simulation results diagram 700 demonstrating a non-limiting example of parameters for the superconducting coaxial cable 310. For example and without limitation, the superconducting coaxial cable 310 can include a length of about 5 centimeters, can be coupled with a 5 fF capacitor, and can be coupled with a DC-SQUID 318 including an inductance of 1 nH. The superconducting coaxial cable 310 can achieve a tuning range of about 710 MHz. One or more DC-SQUIDS 318 coupled with the cable portion 316 can include junctions; and, larger junctions can yield a greater tuning range for the superconducting coaxial cable 310.

In examples, FIG. 7 illustrates three modes (e.g., mode 1, mode 2, and mode 3) of the superconducting coaxial cable 310 as a function of the external flux applied to the DC-SQUID 318. The second mode (mode 2) of the superconducting coaxial cable 310 can be used to execute the transfer of quantum information between the quantum device 302 (e.g., at a first frequency 702) and the microwave optical transducer 304 (e.g., at a second frequency 704).

Figure 8:
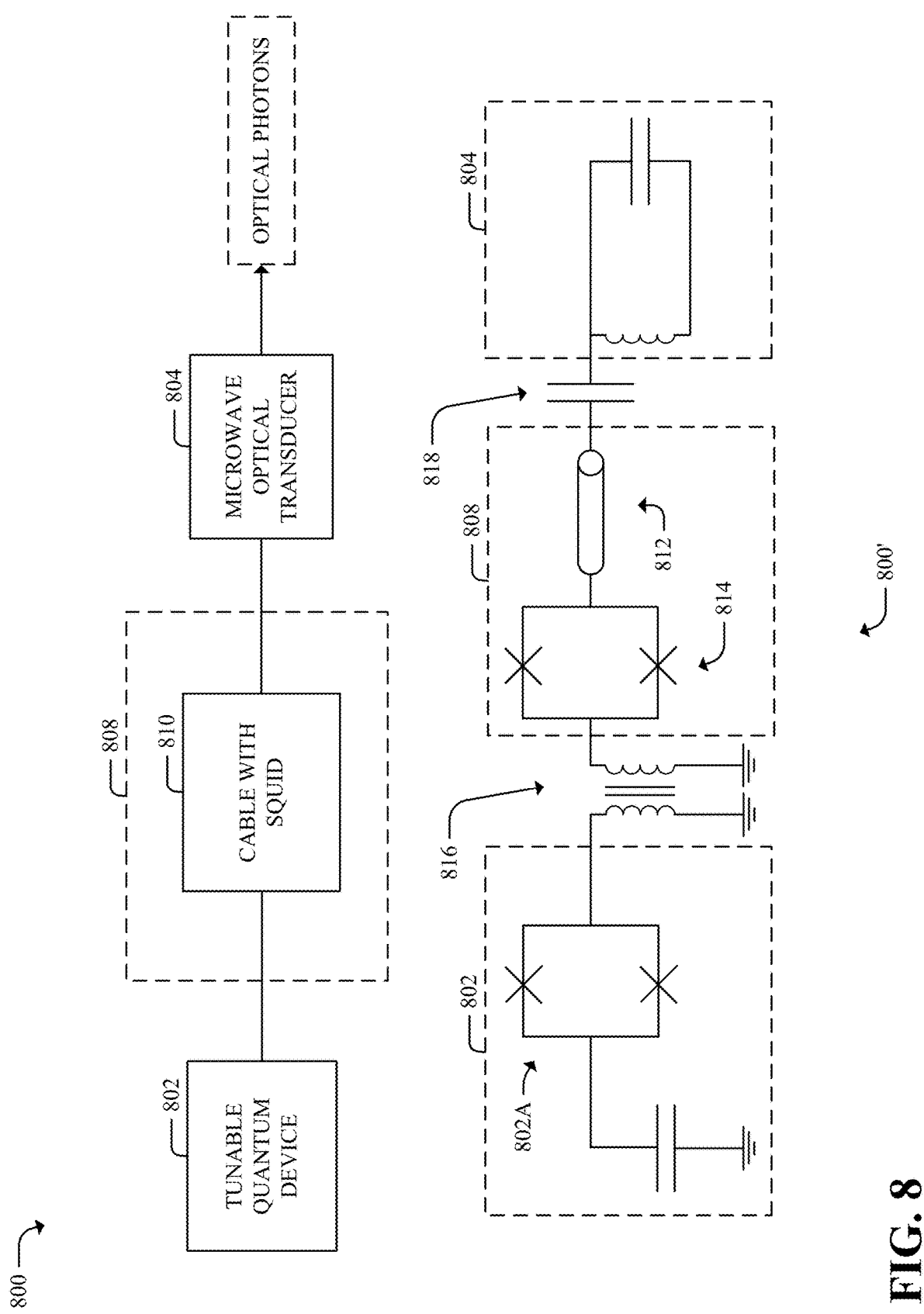
FIG. 8 illustrates a diagram of an example, non-limiting coherent interconnect system that can facilitate the transfer of a quantum state between a superconducting device and a microwave resonator in accordance with one or more embodiments described herein.

With examples, such as generally illustrated in FIG. 8, a non-limiting quantum coherent interconnect system 800 can include a quantum device 802, a microwave optical transducer 804 and a coherent interconnect 808. The non-limiting quantum coherent interconnect system 800 can transfer a state of a qubit of the quantum device 802 to the microwave optical transducer 804. The quantum device 802 can be one or more of a variety of qubit integrated devices, such as a transmon qubit 802A.

In embodiments, the coherent interconnect 808 can be responsible for transferring the quantum state of the quantum device 802 to the microwave optical transducer 804. Further, the microwave optical transducer 804 can be separately packaged from the quantum device 802. The coherent interconnect 808 can be a superconducting coaxial cable 810 including one or more of a variety of lengths. The superconducting coaxial cable 810 can include a DC-SQUID 814. The superconducting coaxial cable 10 can include a flux-tunable DC-SQUID 814 to facilitate frequency tuning of mode frequencies of the superconducting coaxial cable 810.

Further, FIG. 8 illustrates a circuit 800' representative of non-limiting quantum coherent interconnect system 800. For example and without limitation, the non-limiting quantum coherent interconnect system 800 and circuit 800' can include a quantum device 802 (e.g., a transmon qubit 802A) coupled to a microwave optical transducer 804 via a coherent interconnect 808 (e.g., which can include the superconducting coaxial cable 810 comprised of a cable portion 812 and a DC-SQUID 814). The quantum device 802 can be grounded and can be connected with an inductive coupling 816 in series. The DC-SQUID 814 of the superconducting coaxial cable 810 can be inductively coupled to the quantum device 802 at inductive coupling 816. The cable portion 812 of the superconducting coaxial cable 810 can be capacitively coupled with the microwave optical transducer 804 at coupling 818. The superconducting coaxial cable 810 can control the transfer of information between the quantum device 802 by tuning the DC-SQUID 814 of the superconducting coaxial cable 810 (e.g., the coherent interconnect 808).

In embodiments, the quantum device 802 and the coherent interconnect 808 (e.g., the superconducting coaxial cable 810) of the non-limiting quantum coherent interconnect system 800 can be flux-tunable. The quantum state of the quantum device 802 can be transferred to the microwave optical transducer 804 via the coherent interconnect 808. The transmon qubit 802A of the quantum device 802 can include a quantum state. The transmon qubit 802A of the quantum device 802 can be tuned to be in resonance with a mode of the superconducting coaxial cable 810. In response to tuning the quantum device 802 to be in resonance with the superconducting coaxial cable 810, mode of the superconducting coaxial cable 810 can be tuned to be in resonance with the microwave optical transducer 804. The microwave optical transducer 804 can include a fixed frequency (e.g., which is not flux-tunable) such that the superconducting coaxial cable 810 can be tuned to be resonant with the microwave optical transducer 804. Such tuning can enable the system 800 to transfer a quantum state form the quantum device 802 to the microwave optical transducer 804 (e.g., without a coupler or flux-tunable element). Further, the transfer of quantum states can occur bi-directionally using a time reversed pulsed sequence to effectuate the transfer from the microwave optical transducer 804 to the quantum device 802.

In examples, the time reversed pulsed sequence can include the above process performed in a reserved direction, such that the quantum state can be transmitted from the microwave optical transducer 804 (e.g., the lumped element or distributed element resonator) to the quantum device 802. Further, the superconducting cable 810 can be tuned to be resonant with the microwave optical transducer 804 to pass the quantum state from the microwave optical transducer 804 to the superconducting coaxial cable 810; and the quantum device 802 can be tuned to be in resonant with the superconducting coaxial cable 810 such that a quantum state can be transferred between resonant states. Quantum state transfer between a quantum device 802 and a microwave optical transducer 804 of a coherent interconnect 808 can occur bi-directionally in accordance with one or more embodiments described herein.

Figure 9:
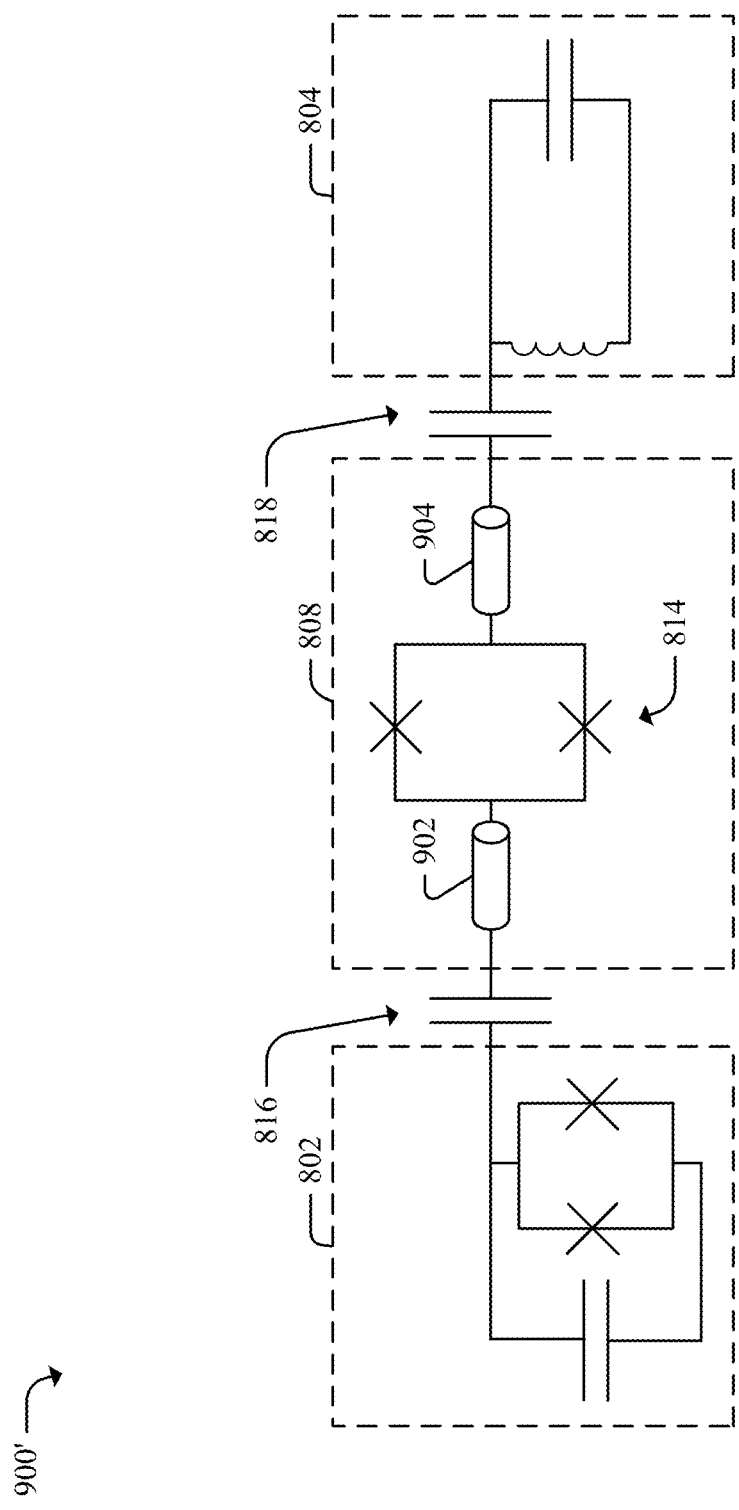
FIG. 9 illustrates a diagram of an example, non-limiting coherent interconnect system that can facilitate the transfer of a quantum state between a superconducting device and a microwave resonator in accordance with one or more embodiments described herein.

Further, FIG. 9 illustrates a circuit 900' representative of non-limiting quantum coherent interconnect system 800. For example and without limitation, the circuit 900' can include a quantum device 802 (e.g., a transmon qubit 802A that is not grounded) coupled to a microwave optical transducer 804 via a coherent interconnect 808. The superconducting coaxial cable 810 of the non-limiting quantum coherent interconnect system 800 can include a first end point 902 and a second end point 904 by which the DC-SQUID 814 can be disposed between (e.g., such that the DC-SQUID 814 can be disposed on a substrate). The first end point 902 can be capacitively coupled with the quantum device 802; and the second end point 904 can be capacitively coupled with the microwave optical transducer 804. The superconducting coaxial cable 810 can include a length of about 5 centimeters and a spacing of modes at about 2 GHZ Free Spectral Range (FSR).

Figure 10:
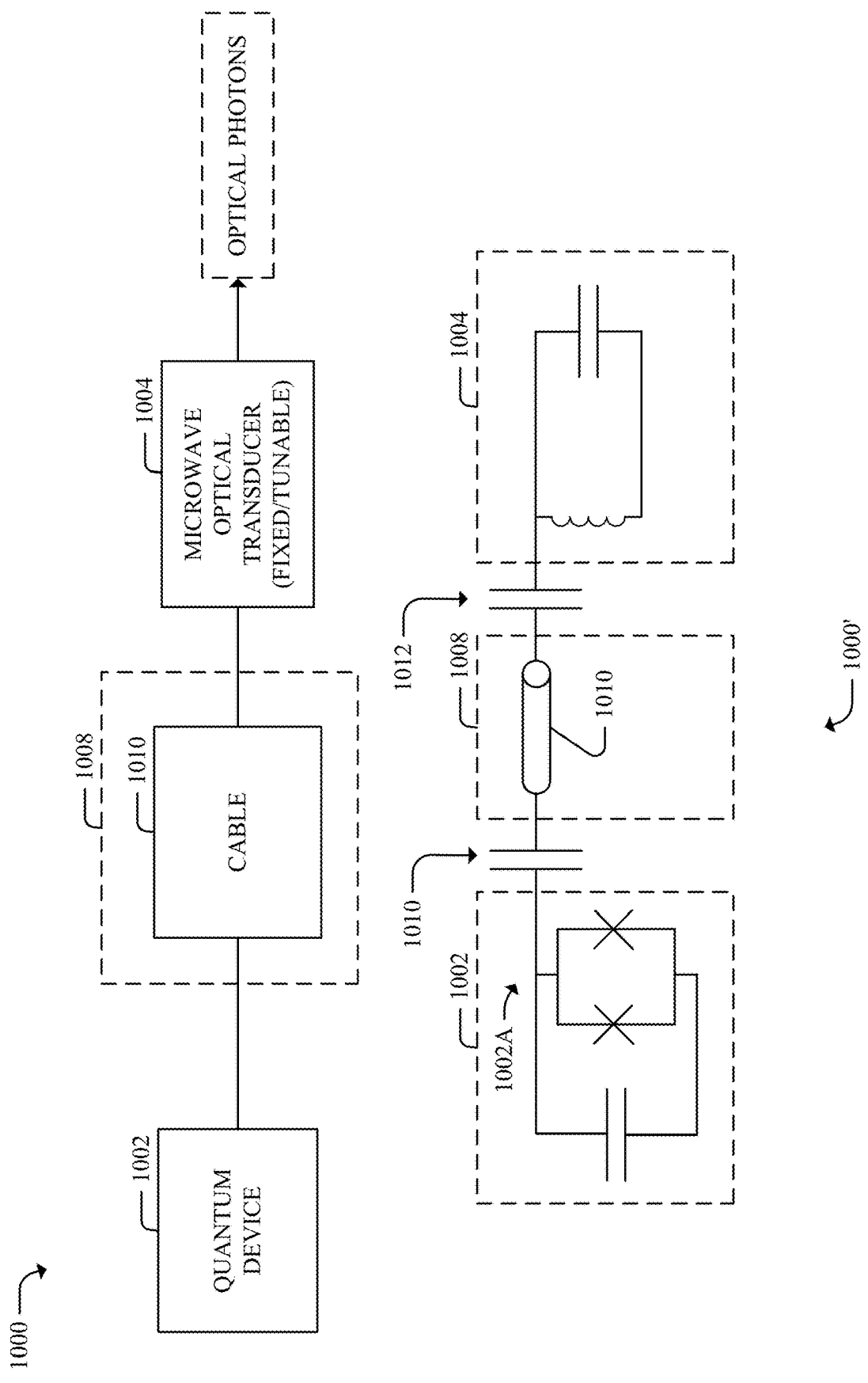
FIG. 10 illustrates a diagram of an example, non-limiting coherent interconnect system that can facilitate the transfer of a quantum state between a superconducting device and a microwave resonator in accordance with one or more embodiments described herein.

With embodiments, FIG. 10 illustrates a non-limiting quantum coherent interconnect system 1000 that can include a quantum device 1002, a microwave optical transducer 1004 and a coherent interconnect 1008. The non-limiting quantum coherent interconnect system 1000 can transfer a state of a qubit of the quantum device 1002 to the microwave optical transducer 1004. The quantum device 1002 can be one or more of a variety of qubit integrated devices, such as a transmon qubit 1002A.

In embodiments, the coherent interconnect 1008 can be responsible for transferring the quantum state of the quantum device 1002 to the microwave optical transducer 1004. Further, the microwave optical transducer 1004 can be separately packaged from the quantum device 1002, and the coherent interconnect 1008 can be a superconducting coaxial cable 1010.

In example embodiments, the microwave optical transducer 1004 can be flux tunable. Further, the non-limiting quantum coherent interconnect system 1000 including a tunable frequency microwave optical transducer 1004 can be represented by the below Hamiltonian equation:

$$\hat{H}_s(t) \approx \underbrace{\left\{\omega_q(t)\hat{q}^\dagger\hat{q} + \frac{1}{2}\alpha_q \hat{q}^\dagger\hat{q}^\dagger\hat{q}\hat{q}\right\}}_{A} +$$

$$\underbrace{\{\omega_r \hat{r}^\dagger \hat{r}\}}_{B} + \underbrace{\sum_{j=q,r} g_{jc}(\hat{j} + \hat{j}^\dagger)(\hat{c} + \hat{c}^\dagger)}_{C} + \underbrace{\left\{\sum_{n=-N}^{N} \omega_{cn}\hat{c}^\dagger_n\hat{c}_n\right\}}_{D}$$

The first portion of the above equation (e.g., portion A) can represent the quantum device 1002; the second portion of the above equation (e.g., portion B) can represent the tunable microwave optical transducer 1004; the third portion of the above equation (e.g., portion C) can represent the interaction between either the a qubit of the quantum device 1004($q$) or the (r) microwave resonator 206 (e.g., of the microwave optical transducer 1004) with the superconducting coaxial cable 1010; and the fourth portion of the above equation (e.g., portion D) can represent the superconducting coaxial cable 1010. With the tunable microwave optical transducer 1004, quantum information (e.g., a quantum state) can be transferred from the quantum device 1002 to the variable frequency microwave optical transducer 1004 via the fixed frequency superconducting coaxial cable 1010 (e.g., the coherent interconnect 1008). The quantum device 1002 and the microwave optical transducer 1004 can be tuned to be substantially resonant with the fixed frequency of the superconducting coaxial cable 1010 to effectuate the transfer of quantum information in a scalable manner.

With additional examples, the microwave optical transducer 1004 can include a fixed frequency. The non-limiting quantum coherent interconnect system 1000 including a fixed frequency microwave optical transducer 1004 can be represented by the below Hamiltonian equation:

$$\hat{H}_s(t) \approx \underbrace{\left\{\omega_q(t)\hat{q}^\dagger\hat{q} + \frac{1}{2}\alpha_q \hat{q}^\dagger\hat{q}^\dagger\hat{q}\hat{q}\right\}}_{A} +$$

$$\underbrace{\{\omega_r \hat{r}^\dagger \hat{r}\}}_{B} + \underbrace{\left\{\sum_{n=-N}^{N} \omega_{cn}\hat{c}^\dagger_n\hat{c}_n\right\}}_{C} + \underbrace{\left\{\sum_{\substack{n=-N \\ j=q,r}} g_{jn}(\hat{j}\hat{c}^\dagger_n + \hat{j}^\dagger\hat{c}_n)\right\}}_{D}$$

The first portion of the above equation (e.g., portion A) can represent the quantum device 1002; the second portion of the above equation (e.g., portion B) can represent the fixed frequency microwave optical transducer 1004; the third portion of the above equation (e.g., portion C) can represent the modes of the superconducting coaxial cable 1010 (e.g., the coherent interconnect 1008); and the fourth portion of the above equation (e.g., portion D) can represent the interaction between either a qubit of the quantum device 1004($q$) or the (r) microwave resonator 206 (e.g., of the microwave optical transducer 1004) with the superconducting coaxial cable 1010. With the fixed frequency microwave optical transducer 1004, quantum information can be transferred from the quantum device 1002 to the fixed frequency microwave optical transducer 1004 via the fixed frequency superconducting coaxial cable 1010 by bringing the quantum device 1002 into resonance with the microwave optical transducer 1004 (e.g., a state of the microwave optical transducer 1004).

In examples, the time reversed pulsed sequence can include the above process performed in a reserved direction, such that the quantum state can be transmitted from the microwave optical transducer 1004 to the quantum device 1002. Further, the superconducting coaxial cable 1010 can be tuned to be resonant with the microwave optical transducer 1004 to pass the quantum state from the microwave optical transducer 1004 to the superconducting coaxial cable 1010; and the quantum device 1002 can be tuned to be in resonant with the superconducting coaxial cable 1000 such that a quantum state can be transferred between resonant states. Quantum state transfer between a quantum device 1002 and a microwave optical transducer 1004 of a coherent interconnect 1008 can occur bi-directionally in accordance with one or more embodiments described herein.

Figure 11:
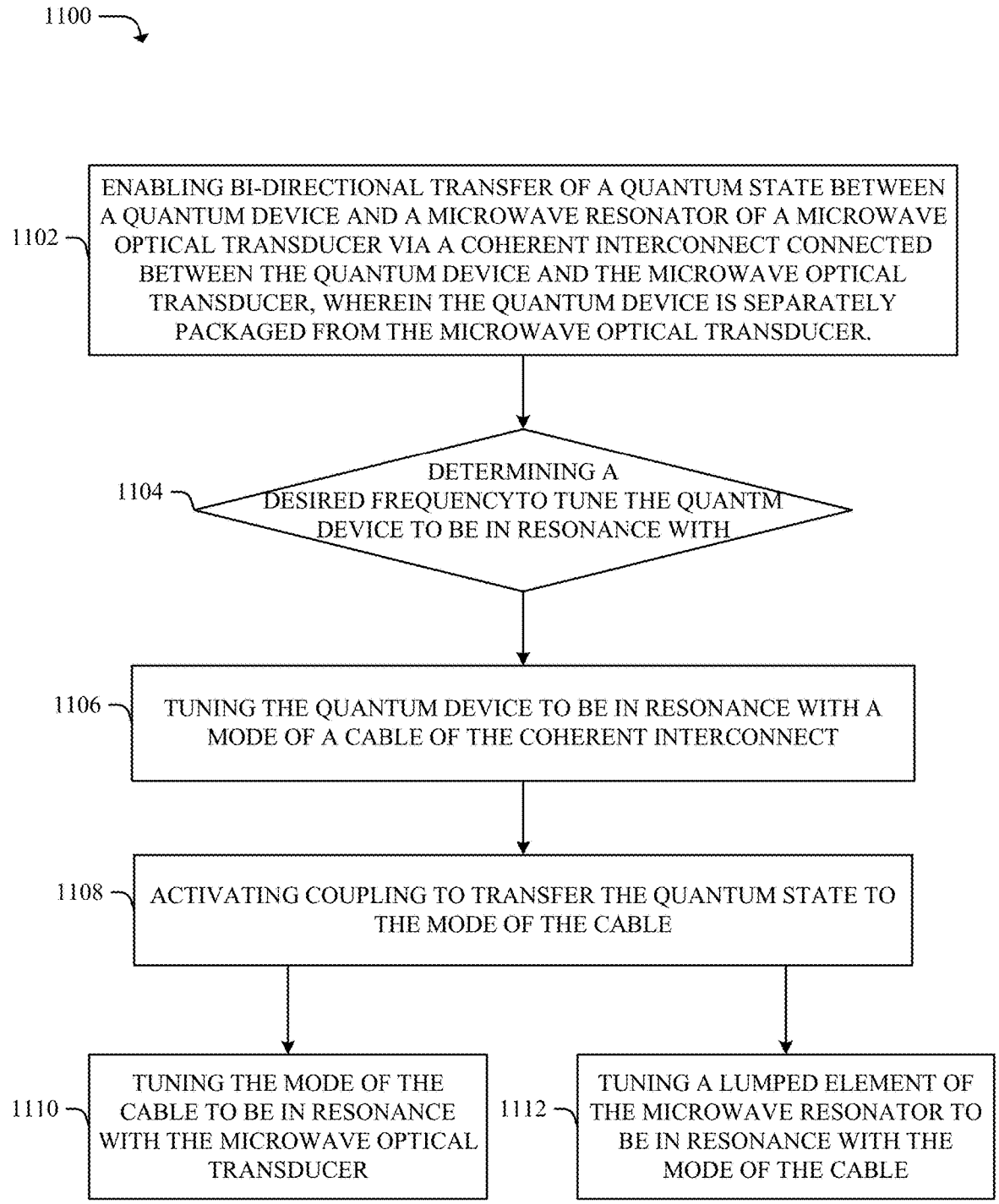
FIG. 11 illustrates a flowchart of an example, non-limiting coherent interconnect method that can facilitate the transfer of a quantum state between a superconducting device and a microwave resonator in accordance with one or more embodiments described herein.

FIG. 11 illustrates a flow diagram of an example, non-limiting method 1100 to facilitate quantum state transfer between a quantum device and a microwave resonator of a coherent interconnect in accordance with one or more embodiments described herein. Repetitive description of like elements and/or processes employed in respective embodiments is omitted for sake of brevity.

At 1102, the non-limiting method 1100 to facilitate quantum state transfer can comprise enabling bi-directional transfer of a quantum state between a quantum device and a microwave resonator of a microwave optical transducer via a coherent interconnect connected between the quantum device and the microwave optical transducer. In embodiments of the non-limiting method 1100, the quantum device can be separately packaged from the microwave optical transducer.

At 1104, the non-limiting method 1100 to facilitate quantum state transfer can comprise determining a desired frequency (e.g., of the cable) to tune the quantum device to be in resonance with. With embodiments, the desired frequency can be a frequency of the cable, a frequency of the flux-tunable element (e.g., the coupler), and/or a frequency of the microwave optical transducer.

At 1106, the non-limiting method 1100 to facilitate quantum state transfer can comprise tuning the quantum device to be in resonance with a mode of a cable of the coherent interconnect.

At 1108, the non-limiting method 1100 to facilitate quantum state transfer can comprise activating coupling to transfer the quantum state to the mode of the cable.

At 1110, the non-limiting method 1100 to facilitate quantum state transfer can comprise tuning the mode of the cable to be in resonance with the microwave optical transducer.

At 1112, the non-limiting method 1100 to facilitate quantum state transfer can comprise tuning a lumped element of the microwave resonator to be in resonance with the mode of the cable.

Aspects of the one or more embodiments described herein are described herein with reference to flowchart illustrations or block diagrams of methods, apparatus (systems), and devices according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a quantum device;
a microwave optical transducer including a microwave resonator; and
a coherent interconnect between the quantum device and the microwave optical transducer that enables bi-directional transfer of a quantum state between the quantum device and the microwave resonator,
wherein the microwave optical transducer is separately packaged from the quantum device.

2. The system of claim 1, wherein the coherent interconnect is a superconducting coaxial cable.

3. The system of claim 2, wherein the superconducting coaxial cable includes a length up to 10 centimeters.

4. The system of claim 1, wherein the quantum device is a transmon qubit.

5. The system of claim 4, wherein the quantum device is connected to a flux-tunable element that modulates the coupling between the quantum device and the coherent interconnect.

6. The system of claim 5, wherein the flux-tunable element is a transmon qubit.

7. The system of claim 5, wherein the flux-tunable element is a radio frequency superconducting quantum interference device (RF-SQUID).

8. The system of claim 1, wherein the coherent interconnect includes a DC SQUID connected in series to the coherent interconnect to permit frequency tuning of mode frequencies of the coherent interconnect.

9. A device, comprising:
a flux-tunable qubit;
a microwave optical transducer; and
a coherent interconnect including a cable coupling the flux-tunable qubit to the microwave optical transducer to enable bi-directional transfer of a quantum state between the microwave optical transducer and the flux-tunable qubit
wherein the microwave optical transducer is separately packaged from the flux-tunable qubit.

10. The device of claim 9, wherein the coherent interconnect comprises a flux-tunable coupler.

11. The device of claim 10, wherein the cable includes a flux-tunable SQUID to facilitate frequency tuning of mode frequencies of the device.

12. The device of claim 11, wherein the microwave optical transducer is flux-tunable.

13. The device of claim 11, wherein the microwave optical transducer is not flux-tunable.

14. The device of claim 9, wherein the cable includes a flux-tunable SQUID to facilitate frequency tuning of mode frequencies of the device, and the microwave optical transducer is not flux-tunable.

15. The device of claim 9, wherein the cable is not flux tunable.

16. The device of claim 9, wherein the cable is flux tunable.

17. A method comprising:
enabling bi-directional transfer of a quantum state between a quantum device and a microwave resonator of a microwave optical transducer via a coherent interconnect connected between the quantum device and the microwave optical transducer, wherein the quantum device is separately packaged from the microwave optical transducer.

18. The method of claim 17, further comprising:
tuning the quantum device to be in resonance with a mode of a cable of the coherent interconnect, and
activating coupling to transfer the quantum state to the mode of the cable.

19. The method of claim 18, further comprising:
tuning the mode of the cable to be in resonance with the microwave resonator that is part of the microwave optical transducer.

20. The method of claim 18, further comprising:
tuning the microwave resonator of the microwave optical transducer to be in resonance with the mode of the cable.

* * * * *